United States Patent Office 3,186,688
Patented June 1, 1965

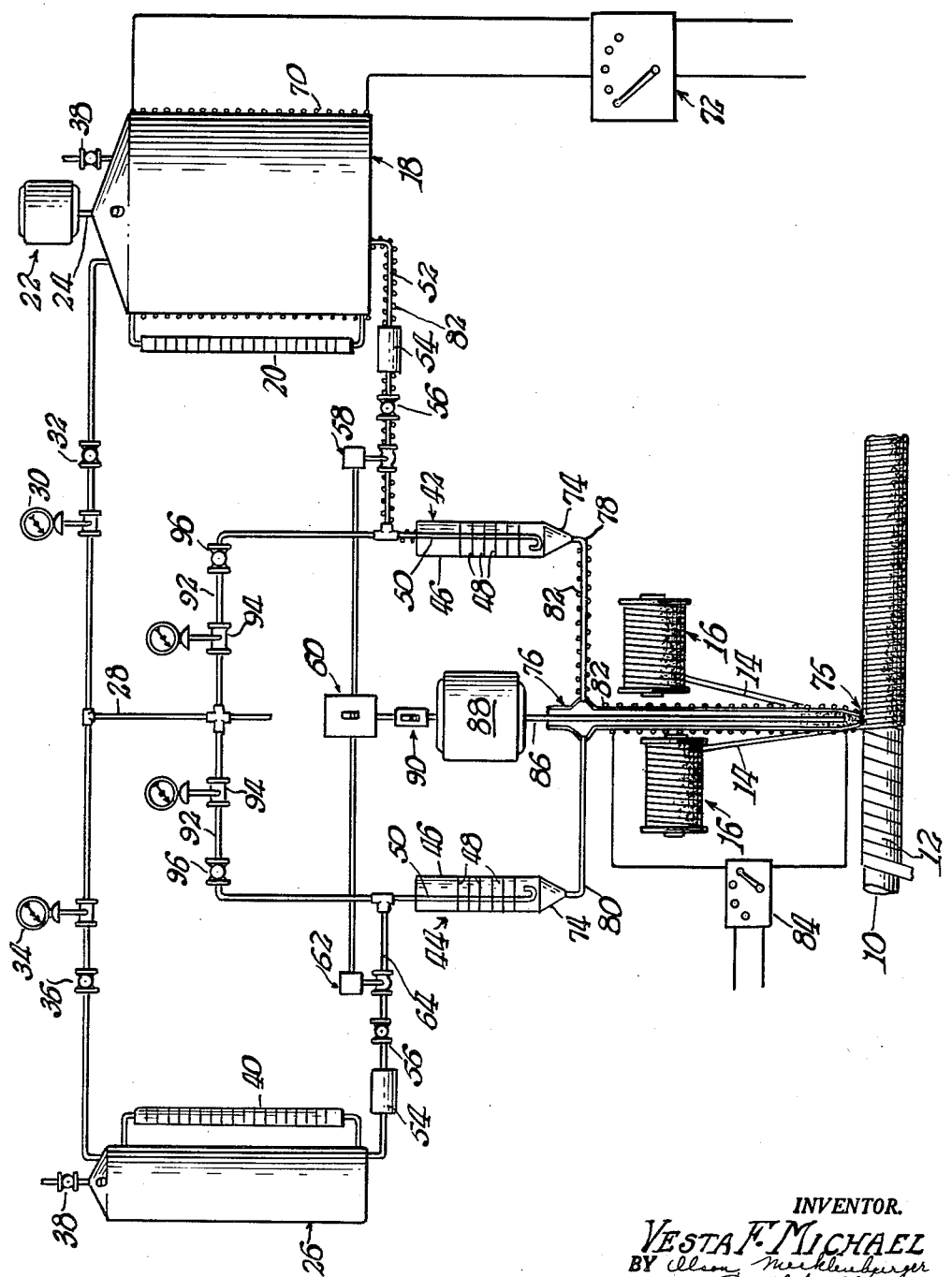

3,186,688
RESIN DISPENSING APPARATUS AND PROCESS
Vesta F. Michael, Wichita, Kans., assignor to Rock Island
Oil & Refining Co., Inc., Wichita, Kans., a corporation
of Kansas
Filed Jan. 23, 1961, Ser. No. 84,232
5 Claims. (Cl. 259—23)

This invention pertains to a novel apparatus for continuously dispensing small quantities of resin and hardener, and more particularly relates to apparatus and a method for continuously dispensing a resin at desired flow rates in a readily curable condition with no danger of plugging the apparatus components.

Certain processes require the substantially continuous use of small quantities of readily curable resin. For instance, in the course of making a plastic-glass roving pipe, the plastic or resin component of the pipe must be discharged on the glass roving in a highly liquid form. In such form the roving is thoroughly impregnated thereby assuring a strong compact pipe which will be free from undesirable delamination of the roving layers which could be caused by faulty resin penetration.

It has been found that epoxy resins which are most desirable for use in glass-plastic pipes are of such viscosity that they must be heated to elevated temperatures to assure desired fluidity and glass roving penetration. At such elevated temperatures, however, the resin cures rapidly when admixed with a hardening agent. Accordingly the resin and hardener mixture must be placed in a desired position of use substantially immediately to prevent an undesired increase of viscosity and loss of fluidity caused by curing of the resin.

Since only small quantities of the epoxy resin are continuously used in applications such as pipe formation, certain operating difficulties become apparent. For instance, in the making of pipe although small quantities of the resin are substantially continuously on demand, large batches of the mixed resin and hardener cannot be prepared. Unused portions of the large batch will cure and become unsuitable for use in the pipe manufacture after a short period of time.

It is an object of this invention to provide apparatus and a method for rapidly forming desired quantities of readily curable resin and dispensing the same while still in a desired fluid, precured condition.

It is another object of this invention to provide novel controls for effecting resin and hardener mixing whereby the formation of a product of desired composition is constantly assured.

It is still another object of this invention to provide an apparatus for forming readily curable resins as desired which is composed of a number of simple and well known elements arranged in a novel combination.

The above and other objects of this invention will become more apparent from an examination of the following detailed disclosure when read in the light of the accompanying drawing and appended claims.

In one embodiment of the provided apparatus assembly two storage vessels in communication with an air pressure source are disposed in fluid communication with two flow meters by means of interconnecting conduit lines. One of the two vessels contains an epoxy resin or other readily curable fluid and the second vessel contains a hardener such as triethylene tetramine which is necessary to cure the epoxy or other curable fluid. Both the epoxy and hardener remain fluid while unmixed; however, upon mixing the two the epoxy resin immediately begins to harden and the originally fluid components begin to thicken.

Each of the flow meters employed with the hardener and resin comprises a glass cylinder having calibrations placed on a wall portion thereof. Enclosed within each meter cylinder is an upwardly directed jet nozzle. The distance that the resin or hardener jets upwardly in a substantially vertical plane in the meter cylinder provides evidence of the actual flow rate from the storage vessels at any particular instant.

The fluid discharge from the two glass cylinders flows into a mixing chamber of small volume in which a stirring rod or other equivalent means continuously mixes the resin and hardener together and assists in forcing the same from the chamber in a fluid form ready for immediate use. Quick-acting, full flow solenoid valves are disposed in the conduits between the storage reservoirs and the fluid meters whereby the flow from the reservoirs may be instantaneously initiated or terminated as will hereinafter be explained in greater detail.

For a more complete understanding of this invention, reference will now be made to the drawing wherein one form of apparatus made in accordance with this invention is illustrated in elevation, certain elements of the apparatus being illustrated in section.

In the drawing, a mandrel 10 is illustrated on which a paper liner 12 is disposed and upon which liner strands of glass roving 14 are rotatably wound under tension. The roving is continuously unwound from illustrated spools 16. In accordance with one method of making a glass fiber-plastic pipe, glass roving upon engaging the illustrated paper liner 12 is simultaneously impregnated with a resin in a highly fluid state, such as an epoxy resin, which saturates the glass fibers of the roving. It is desired, therefore, that the top of paper liner 12 and the glass roving spirals be substantially completely saturated with the epoxy resin thereby assuring a dense strong pipe member free of air bubbles conducive to roving delamination and resulting low pipe strength. It should be noted that the illustrated apparatus of the drawing, with the exception of the mandrel and partially formed pipe thereon, may be mounted upon a movable platform (not shown). Such platform may reciprocally move along the rotating mandrel 10 in the normal course of glass roving build-up on the liner 12 as the desired glass-resin pipe is being formed.

A resin storage tank 18 is illustrated in the drawing and has as its function the storage of desired volumes of a resin, such as an epoxy resin. The stored resin will ultimately be dispensed on the glass roving 14. The liquid level within the reservoir 18 may be readily noted by means of a vertical calibrated gauge glass 20 disposed adjacent a peripheral portion of the illustrated tank. A motor such as illustrated motor 22 may drive a stirring rod 24, fragmentarily illustrated, if it is desired to constantly agitate the contents of the resin storage tank. Such agitation is desired if settling occurs within the tank, such as may occur when fillers or pigments are added to the resin.

Oppositely disposed and on the same horizontal plane with the resin storage tank 18 is a hardener storage tank 26 of lesser volume. The tank 26 serves as a reservoir for a hardening agent which is necessary for effecting final cure of the resin when the same is applied to the glass roving in the manner illustrated in the drawing. In the event that an epoxy resin serves as the desired resin component for pipe manufacture, a suitable hardener is triethylene tetramine. Ethylene oxide and diethylene triamine for example, may also serve as hardeners for epoxy resins.

It is desired that the tanks 18 and 26 be so designed that the height of liquid in one tank represents the proper reacting quantity with precisely the same height of liquid in the other tank. Inasmuch as a lesser volume of hardener is generally required than the resin, the resin storage tank 18 is illustrated in the drawing as being larger than the hardener tank 26. Since the precise volume ratio between resin and hardener is known, the tanks are formed so that the cross-sectional area of one tank defines a ratio with the cross-sectional area of the other tank which is the same as the resin-hardener volume ratio employed in the course of pipe manufacture. Thus, if the hardener triethylene tetramine is being stored in tank 26 for use with a resin having an epoxy equivalent of 175, which resin is stored in tank 18, then 12 parts by volume of the hardener would be necessary to harden 100 parts of resin and, accordingly, the cross-sectional area of tank 18 should define the ratio of 100/12 with the cross-sectional area of tank 26.

By employing the proper reservoir cross sections it is possible to determine by a glance at the gauges the quantities of resin and hardener employed in any one operation. Also, if the liquid levels are not uniform in the two tanks, a warning is given that the sysem is not functioning properly.

In order to assure uniform flow from each of the two tanks, regardless of the fluid head within the tanks, a positive air pressure created by dry air supply line 28 is employed for forcing the resin from tank 18 and the hardener from tank 26. Regulator 30 is disposed in the dry air supply line entering tank 18. Valve member 32 closes off tank 18 from the dry air supply line 28 when necessary as in the course of filling the tank. Regulator 34 is employed in the dry air supply line entering storage tank 26. Valve 36 is also disposed in this latter line for shutting off the air supply, when desired, into the tank. Each storage tank also employs a relief valve 38 whereby pressure content in the tank may be exhausted to the atmosphere. Calibrated gauge glass 40 used in conjunction with tank 26 is preferably identical with gauge glass 20 so that the levels within the two tanks may be readily ascertained and, as above mentioned, if the levels are substantially the same (assuming the tank diameters are in proper ratio) proper functioning of the illustrated apparatus is assumed.

The contents of the two tanks 18 and 26 are in fluid communication with the transparent flow gauges 42 and 44. Each of the novel illustrated gauges comprises a transparent outer cylindrical shell 46 having a plurality of vertical calibrations 48 formed on a peripheral portion thereof. Disposed within each cylindrical shell 46 is a jet nozzle 50, the distal end limit of which projects upwardly. Consequently, when fluid flows from the tanks 26 and 18 through the jet nozzles, the fluid projects upwardly to a height directly proportional to the flow rate from the storage tanks. By simply calibrating each gauge with the substance stored therein, a gauge, which at a glance instantaneously discloses a flow rate from the storage tank with which it is associated, may be provided. Inasmuch as the resin and hardener quantities are continuously supplied for irregular periods, it is desired that the small quantities of resin and hardener which are dispensed on the glass roving of the pipe being formed always be maintained in proper relative proportions. The transparent flow gauges 42 and 44 assist in the constant maintenance of this desired ratio between the resin and hardener.

Disposed in connecting line 52 between tank 18 and flow gauge 42 therefor is a filter 54, a manually operable valve 56, for fine adjustment of fluid flow through line 52, and an instantaneously acting solenoid valve 58. The latter valve is energized by means of a switch 60 which also simultaneously energizes solenoid valve 62 disposed in a conduit 64 interconnecting the hardener storage tank 26 and its flow gauge 44. The valves are simultaneously actuated into either the fully open or fully closed position by switch 60. A filter 54 and a manually operated valve 56 are also disposed in conduit 64.

Certain epoxy resins have been found especially satisfactory for purposes of pipe formation. It is desired that these resins be dispensed on the glass roving of the pipe at an elevated temperature of at least 150° F. The elevated temperatures are desired for a number of reasons. The hot epoxy resin substantially eliminates the entrapment of air bubbles and, accordingly, provides a stronger final pipe product. Since desired epoxy resins for pipe formation have a minimum room temperature viscosity of about 6400 centipoises, the elevated temperature assures a fluid resin of good penetration. Still further, by using the resin at an elevated temperature a rapid cure is assured when the same is applied to the glass roving of the pipe.

To assure the maintenance of a desired resin temperature in the storage tank 18, a resistance wire 70 illustrated in section in the drawing or any other equivalent heating means may be employed. It will be noted from the drawing that a powerstat 72 may be employed for controlling the amount of current passing through resistance wire heater 70 and accordingly the temperature effected within the tank 18.

The resin and hardener jets emerging from the jet nozzles 50 of the two flow gauges 42 and 44, after their upward momentums have been overcome by gravity, flow downwardly into the conical lower end limits 74 of the two flow gauges from which the resin and hardener pass into a mixing tube 76 by means of interconnecting conduit portions 78 and 80 respectively. The conduit portions 52 and 78, in addition to the tube 76, are all encircled with a resistance wire 82 for purposes of controlling the temperatures within said conduit portions and mixing tube, whereby the high fluidity of the epoxy resin passing from the tank 18 is assured. The heat generated by the wire 82 is controlled by powerstat 84.

It is the function of the mixing tube 76 to provide a chamber adjacent the glass roving 14 or other zone of use, wherein the resin and hardener may be intimately mixed just prior to the application of the resin-hardener mixture to the adjacent roving. A rotating glass rod 86 or other equivalent stirring means may be disposed within the tube 76. Rod 86 is rotatably driven by motor 88 and assures an intimate admixture of the inflowing resin and hardener by shearing the fluid mixture against the inner periphery of the tube as the fluid mixture descends. The resin-hardener mixture is dispensed from lower end limit 75 of tube 76 onto the glass roving 14 simultaneously with the glass application to the liner 12 disposed on mandrel 10.

Utilizing the illustrated apparatus, small quantities of resin and hardener which have an extremely short mix life may be substantially instantaneously dispensed from mixing tube 76 without any danger of clogging the apparatus by means of resin hardening within any component thereof. The positive air pressure exerted on the surfaces within the tanks 18 and 26 assure instantaneous passage of the resin and hardener from the storage tanks once the solenoid valves 62 and 58 have been opened by merely flicking the switch 60. The flow rates of the materials emerging from the tanks 18 and 26 may be readily visually ascertained by glancing at the gauges 42 and 44.

The fluid materials flow from the gauges into the mixing tube 76 which is of relatively small capacity possessing a volume which is a small fraction of either of the tanks. The resin and hardener will continue to flow from the apertured distal end of tube 76, illustrated in section, until the solenoid valves 62 and 58 are instantaneously closed by means of switch 60. Motor 88 may be actuated independently of solenoid valves 62 and 58 by a separate switch 90. It may be desirable to allow the rod 86 to continue to rotate after the solenoid valves have been closed to assure the complete dispensing of, and consequent absence of, resin and hardener within tube 76.

As an added precaution against clogging of the jet nozzles 50 of the flow gauges, air conduits 92 are joined to each jet nozzle so that air may be continuously blowing through the nozzle conduit portions 80 and 78 after the flow of resin and hardener has ceased by closing the solenoid valves 58 and 62. Regulators 94 and manually operable valves 96 may be disposed in each line 92 connected to jet nozzles 50. The air flow assures substantially complete removal of all resin and hardener from the flow gauge conduit portions 80 and 78, as well as mixing tube 76.

When tanks 18 and 26 are disposed above the level of the flow meters and mixing tube 76, as illustrated in the drawing, the tank contents will flow by gravity into the meters and tube. The air pressure exerted in the tanks with such relative disposition need only be sufficient to negate any variance in the rate of flow from the tanks which might be occasioned in either tank by varying liquid heads. The scope of this invention, however, also encompasses apparatus arrangements in which the storage tanks and mixing tube are so relatively disposed that pressure must be completely relied upon for forcing the liquid contents from the storage tanks. Utilizing such installations the pressure input into each tank must be such that the liquid levels decrease uniformly, assuming that equivalent levels in the tanks define reacting volumes as previously described.

Utilizing the above described apparatus a resin and hardening agent are substantially instantaneously available in a continuous stream at an elevated temperature without any danger of clogging any part of the apparatus. The above described apparatus dispenses with the necessity of forming any large batches of resin and hardener and yet enables a continuous stream of readily curable resin and hardener to be available.

It is apparent that certain modifications may be made in the illustrated apparatus which will still remain within the spirit of this invention. For instance, storage tank 26, as well as conduit portions 64 and 80, may also be heated if deemed desirable. However, in view of the larger quantities of resin which are employed, the desired 150° F. temperature of the resin-hardener mixture emerging from the bottom of tube 76 may be effected by allowing for the cooling effect of the unheated hardener after the same has combined with the heated resin maintained within reservoir 18 at a temperature of between about 185–200° F. It is under these storage conditions in which the epoxy is maintained at a temperature of 185–200° F. and the triethylene tetramine hardener maintained at room temperature that the 12 to 1 resin to hardener volume ratio obtains. Inasmuch as the specific gravity of the hardener or resin will vary with temperature, this factor should be appreciated when designing the storage reservoirs having cross-sectional areas in the same ratio as the volume ratio in which employed.

It is intended that this invention be limited only by the scope of the pending claims.

I claim:

1. Apparatus for dispensing resin and hardener in a readily curable condition comprising discrete storage vessels for said resin and for said hardener, pressure means for forcing said resin and said hardener from said storage vessels, flow meters in fluid communication with said storage vessels, discharge nozzles disposed in each of said flow meters, conduits connecting said storage vessels and said discharge nozzles, valve means disposed in said conduits, said pressure means also being connected directly to said flow meter discharge nozzles whereby pressure may be exerted directly through said jet nozzles when said valve means in said conduits are closed, a mixing chamber in fluid communication with the discharge from each of said flow meters, and means disposed in said mixing chamber for intimately mixing said resin and hardener.

2. Apparatus for dispensing fluid reactants comprising a storage vessel for each of said reactants, pressure means for forcing said reactants from said storage vessels, flow meters in fluid communication with said storage vessels for indicating the flow rate of each of said reactants from said storage vessels, conduits connecting said storage vessels and said flow meters, valve means disposed in said conduits, said pressure means being connected to said flow meters whereby pressure may be exerted directly through said flow meters and remove any reactant therein when said valve means are in the closed position, and means in fluid communication with said flow meters for receiving the discharge of said flow meters.

3. Apparatus for continuously dispensing reactants capable of immediately reacting with each other comprising a storage vessel for each of said reactants, a reaction vessel disposed below the level of said storage vessels and in fluid communication therewith whereby said reactants may be assisted by gravity in flowing from said storage vessels to said reaction vessel; flow meters disposed below the level of said storage vessels and above the level of said reaction vessel whereby said reactants may be assisted by gravity in flowing from said storage vessels, through said flow meters and into said reaction vessel, and pressure means exerting pressure on the reactant surface in each of said storage vessels for assuring the flow of desired relative quantities of reactants from said storage vessels into said flow meters.

4. Apparatus for continuously dispensing liquid reactants capable of immediately reacting with each other comprising a storage vessel for each of said reactants, the cross-sectional areas of said storage vessels being in the same ratio as the desired reacting ratio of the reactants, means for applying a substantially uniform pressure per unit area to the upper surfaces of said liquid reactants, whereby said reactants may flow at desired rates in a reacting ratio from said storage vessels; flow meters for each of said reactants in fluid communication with said storage vessels for visually revealing the flow rates of the reactants from said storage vessels; said flow meters having a transparent housing portion and means for jetting the reactant to be metered relative to said housing transparent portion whereby the relative disposition between the jetted fluid reactant and the housing varies with the rate of flow of the reactant, and reaction chamber means disposed beneath said flow meters whereby the reactant discharge from said flow meters may flow by gravity thereinto.

5. In a process for dispensing fluid reactants adapted to readily react with each other, the steps comprising flowing said reactants with the assistance of gravity from storage zones to metering zones, wherein the rate of flow of said reactants may be visually ascertained, and from said metering zones to a zone of reaction; fluid pressure being impressed on said fluid reactants in said storage zones to assist the forces of gravity so as to assure a flow of said reactants from said storage zones to said zone of reaction in desired reacting quantities.

References Cited by the Examiner

UNITED STATES PATENTS

| | | | |
|---|---|---|---|
| 1,840,608 | 1/32 | Slichter | 73—194 |
| 2,030,004 | 2/36 | Hutchison | 222—145 |
| 2,198,524 | 4/40 | Berwick et al. | 222—145 |
| 2,343,030 | 2/44 | Simmons | 73—194 X |
| 2,460,605 | 2/49 | Soissa | 259—180 X |
| 2,663,188 | 12/53 | Nelson | 73—195 |
| 2,698,303 | 12/54 | Blair et al. | 259—8 X |
| 2,792,324 | 5/57 | Daley et al. | 154—83 |
| 2,802,648 | 8/57 | Christensen et al. | 259—4 X |
| 2,837,456 | 6/58 | Parilla | 154—83 |
| 2,880,455 | 4/59 | Mineah | 259—9 X |
| 2,958,516 | 11/60 | Wall et al. | 259—8 |
| 2,970,817 | 2/61 | Gurley | 259—7 |
| 2,974,830 | 3/61 | Hood | 259—7 |
| 3,067,987 | 12/62 | Ballou et al. | 259—7 |

WALTER A. SCHEEL, *Primary Examiner.*
C. F. KRAFFT, *Examiner.*